United States Patent
Balakrishnan

(10) Patent No.: US 11,996,994 B2
(45) Date of Patent: *May 28, 2024

(54) CUSTOMIZED CLOUD SERVICE

(71) Applicant: SUSE LLC, Pleasant Grove, UT (US)

(72) Inventor: Sandhya Balakrishnan, Bangalore (IN)

(73) Assignee: SUSE LLC, Pleasant Grove, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,024

(22) Filed: May 31, 2023

(65) Prior Publication Data

US 2023/0318939 A1 Oct. 5, 2023

Related U.S. Application Data

(63) Continuation of application No. 17/590,802, filed on Feb. 1, 2022, now Pat. No. 11,700,188, which is a continuation of application No. 15/500,036, filed as application No. PCT/US2014/065460 on Nov. 13, 2014, now Pat. No. 11,240,124.

(30) Foreign Application Priority Data

Sep. 26, 2014 (IN) .......................... 4728/CHE/2014

(51) Int. Cl.
*H04L 41/22* (2022.01)
*H04L 41/084* (2022.01)
*H04L 41/50* (2022.01)
*H04L 41/5009* (2022.01)
*H04L 41/5041* (2022.01)

(52) U.S. Cl.
CPC ...... *H04L 41/5048* (2013.01); *H04L 41/0843* (2013.01); *H04L 41/22* (2013.01); *H04L 41/5009* (2013.01); *H04L 41/5096* (2013.01)

(58) Field of Classification Search
CPC . H04L 41/5048; H04L 41/0843; H04L 41/22; H04L 41/5009; H04L 41/5096
USPC ................ 709/220, 224, 225, 226, 227, 228
See application file for complete search history.

(56) References Cited

U.S. PATENT DOCUMENTS

| | | | |
|---|---|---|---|
| 11,240,124 B2 * | 2/2022 | Balakrishnan | H04L 41/0895 |
| 11,700,188 B2 * | 7/2023 | Balakrishnan | H04L 41/5009 |
| | | | 709/226 |
| 2004/0045001 A1 | 3/2004 | Bryant | |
| 2006/0235732 A1 | 10/2006 | Miller et al. | |
| 2008/0312986 A1 | 12/2008 | Braun et al. | |
| 2011/0219434 A1 | 9/2011 | Betz et al. | |
| 2012/0072597 A1 | 3/2012 | Teather et al. | |
| 2012/0179671 A1 | 7/2012 | Turner et al. | |
| 2013/0018994 A1 | 1/2013 | Flavel et al. | |
| 2013/0054301 A1 | 2/2013 | Nezhad et al. | |
| 2013/0145033 A1 | 6/2013 | Polla et al. | |

(Continued)

FOREIGN PATENT DOCUMENTS

| | | | | |
|---|---|---|---|---|
| EP | 3198793 A1 | 8/2017 | | |
| EP | 4271068 A1 * | 11/2023 | ............ | H04W 64/00 |
| WO | 2016048393 A1 | 3/2016 | | |

*Primary Examiner* — Khanh Q Dinh

(57) ABSTRACT

Some examples described herein relate to providing a customized cloud service. In an example, Key Service Indicators (KSI) may be received for a cloud service. The Key Service Indicators may be associated with a cloud service template for providing the cloud service. The resources required for providing the cloud service may be identified based on the Key Service Indicators.

18 Claims, 6 Drawing Sheets

(56) References Cited

U.S. PATENT DOCUMENTS

| | | |
|---|---|---|
| 2013/0227137 A1 | 8/2013 | Damola et al. |
| 2013/0232463 A1 | 9/2013 | Nagaraja et al. |
| 2013/0291052 A1 | 10/2013 | Hadar et al. |
| 2014/0006350 A1 | 1/2014 | Fukui et al. |
| 2014/0047099 A1 | 2/2014 | Flores et al. |
| 2014/0129389 A1 | 5/2014 | Patel et al. |
| 2014/0129703 A1 | 5/2014 | Patel et al. |
| 2014/0173089 A1 | 6/2014 | Li et al. |
| 2014/0207944 A1 | 7/2014 | Emaru |
| 2015/0006733 A1 | 1/2015 | Khan et al. |
| 2015/0081907 A1 | 3/2015 | Scharf et al. |
| 2015/0135305 A1 | 5/2015 | Cabrera et al. |
| 2015/0293060 A1 | 10/2015 | Jacobsen |
| 2015/0304240 A1 | 10/2015 | Mandaleeka et al. |
| 2016/0072886 A1 | 3/2016 | Lin et al. |
| 2016/0092253 A1 | 3/2016 | Crowell et al. |
| 2016/0192312 A1 | 6/2016 | Lambert et al. |
| 2019/0174449 A1 | 6/2019 | Shan et al. |
| 2019/0174466 A1 | 6/2019 | Zhang et al. |
| 2019/0281587 A1 | 9/2019 | Zhang et al. |
| 2020/0389876 A1 | 12/2020 | Islam et al. |
| 2021/0007149 A1 | 1/2021 | Li et al. |
| 2021/0022018 A1 | 1/2021 | Belov et al. |
| 2021/0298048 A1 | 9/2021 | Sosnin et al. |
| 2022/0015150 A1 | 1/2022 | Ye et al. |
| 2022/0038935 A1 | 2/2022 | Xiong et al. |
| 2022/0095240 A1 | 3/2022 | Ying et al. |
| 2022/0095260 A1* | 3/2022 | Shan ............... H04W 60/04 |
| 2022/0104053 A1* | 3/2022 | Ye .................. H04W 24/10 |
| 2022/0109515 A1* | 4/2022 | Chervyakov ........ H04B 17/21 |
| 2022/0109546 A1* | 4/2022 | Panteleev .......... H04L 1/1887 |
| 2022/0110112 A1* | 4/2022 | Wei ............... H04W 72/0453 |
| 2022/0123902 A1* | 4/2022 | Panteleev .......... H04L 5/0053 |
| 2022/0124531 A1* | 4/2022 | Miao ............... H04B 17/345 |
| 2022/0124723 A1* | 4/2022 | Li ................. H04W 72/542 |
| 2022/0174735 A1 | 6/2022 | Li et al. |

\* cited by examiner

CUSTOMIZED CLOUD SERVICE

CROSS-REFERENCE TO RELATED APPLICATIONS

This application is a continuation of U.S. patent application Ser. No. 17/590,802, filed on Feb. 1, 2022, now U.S. Pat. No. 11,700,188, issued on Jul. 11, 2023, which is a continuation of U.S. patent application Ser. No. 15/500,036, filed on Jan. 28, 2017, now U.S. Pat. No. 11,240,124, issued on Feb. 1, 2022, which is the U.S. National Stage Entry of PCT/US2014/065460, filed on Nov. 13, 2014, which claims priority to Indian Patent Application No. 4728/CHE/2014, filed on Sep. 26, 2014, the entire disclosure of which are incorporated by reference herein.

BACKGROUND

Businesses are moving to the cloud in increasing numbers. Enterprises users recognize cloud advantages that help speed innovation, accelerate business processes, and reduce time to revenue. Generally speaking, cloud computing involves delivery of computing as a service rather than a product, whereby shared resources (software, storage resources, etc.) are provided to computing devices as a service. The resources are shared over a network such as the internet. Cloud computing thus provides a quick and scalable access to computing resources and information technology (IT) services.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
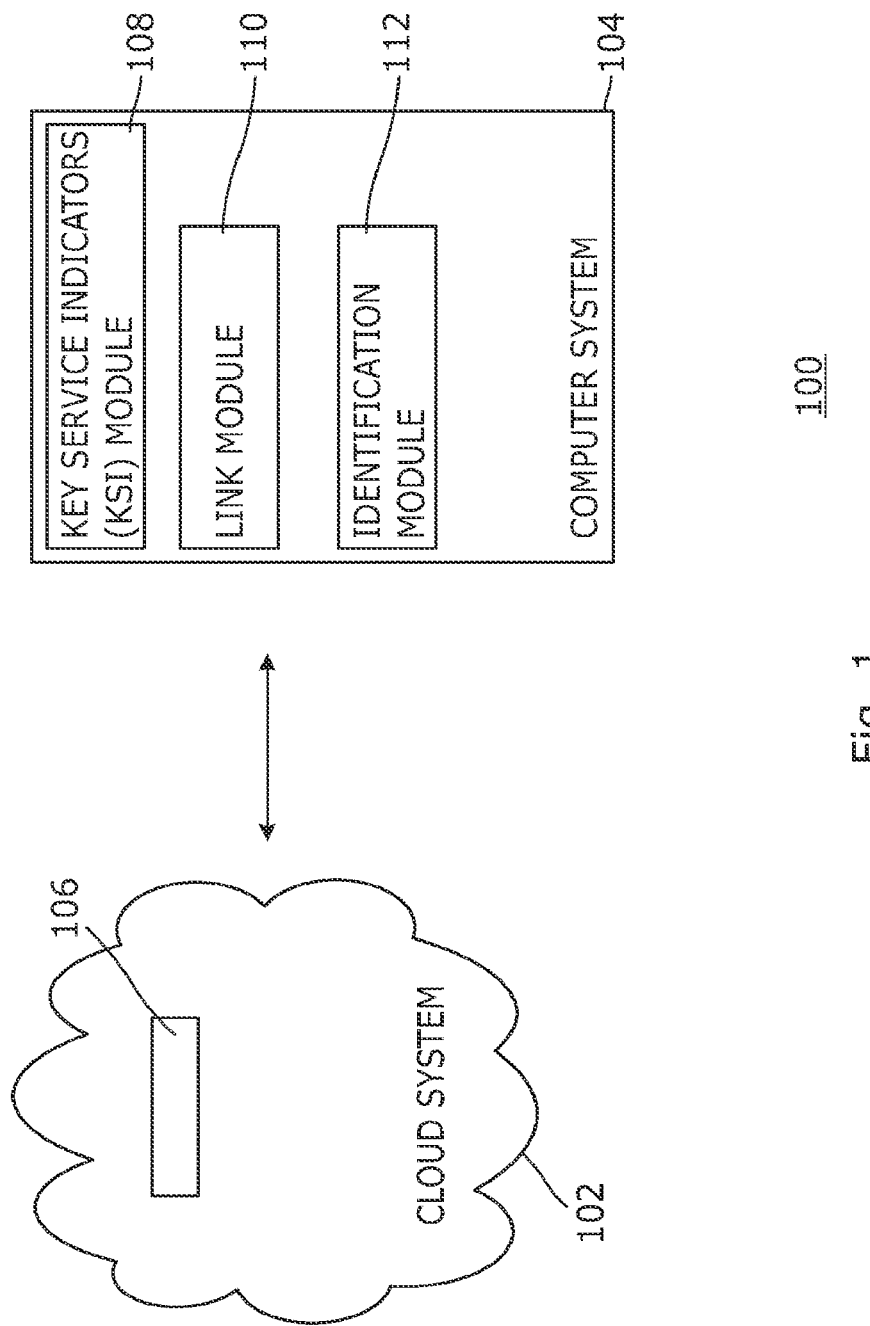
FIG. 1 is a block diagram of an example computing environment for providing a customized cloud service.

Cloud computing is a delivery model for technology-enabled services that provides on-demand and pay-as-you-use access to an elastic pool of shared computing resources. Some examples of such resources may include applications, servers, storage, networks, etc. Cloud computing allows rapid provisioning of computing resources that could be scaled up or down depending on the requirements of a customer. Thus, these assets may be consumed "as a service".

There are many models of cloud computing such as Infrastructure-as-a-Service (IaaS), Platform-as-a-Service (PaaS) and Software-as-a-Service (SaaS). Depending on a client's requirement, a cloud service provider may provide either of the aforementioned services, each of which may require provisioning of certain resources on a cloud.

A cloud service provider may use a cloud management software for providing a cloud service (such as, IaaS, PaaS, SaaS, etc.). Such tools provide standard service templates that may be used by a customer of the cloud service provider to deploy a cloud application or service. Although convenient, cloud services or workloads deployed using such generic templates may come short during an actual deployment since they may not offer further service distinction. Said differently, cloud services created from the same template may not be distinguishable in terms of specific business characteristics and attributes. Needless to say, this is not desirable from the perspective of a cloud user. Since business requirements vary among customers, a cloud service provided by a cloud service provider address business needs of a user. An ideal cloud service should be specific to a business solution, and provide complete control to an enterprise over its business processes that are managed through the cloud service. Presently, it is not possible to implement or enforce additional or specific business requirements (such as, security, availability, etc.) via a cloud service created from a generic template.

To address these issues, the present disclosure describes various examples for providing a customized cloud service. In an example, a cloud system may receive Key Service Indicators (KSI) for a cloud service or workload. The cloud system may associate the Key Service Indicators with a cloud service template for providing the cloud service. The cloud system may then identify, based on the Key Service Indicators, resources required for providing the cloud service.

The example implementations mentioned herein enable creation of unique custom solutions in a cloud by using Key Service Indicators (KSI) for a business. It helps enterprises have a better control over their business processes. For instance, it may help organizations make informed decisions at the time of creating a customized cloud solution. These may include, for instance, deployment of application workload on specific hosts in a manner that two or more critical business applications are never on the same host; allocating sufficient resources such that critical needs of a business application are constantly met; and restricting unwanted collection of metrics and monitoring where undesired thereby using cloud resources optimally and providing cost benefit to organizations.

As used herein, the term "cloud service" may include any resource that is provided over the Internet. Some non-limiting examples of common cloud service resources may include Software as a Service (SaaS), Platform as a Service (PaaS) and Infrastructure as a Service (IaaS).

FIG. 1 is a block diagram of an example computing environment 100 for providing a customized cloud service. Computing environment 100 may include a cloud system (or "cloud") 102 and a computer system 104. In an example, cloud system may be in communication with computer system via a computer network. Computer network may be a wireless or wired network. Computer network may include, for example, a Local Area Network (LAN), a Wireless Local Area Network (WAN), a Metropolitan Area Network (MAN), a Storage Area Network (SAN), a Campus Area Network (CAN), or the like. Further, computer network may be a public network (for example, the Internet) or a private network (for example, an intranet). In another example, computer system may be a part of cloud system. In other words, computer system may be a component of cloud system.

As used herein, the term cloud system (or "cloud") 102 may include a public cloud, a private cloud, or a hybrid cloud. To explain briefly, cloud system 102 may be termed as a public cloud if cloud computing services are rendered over a public network such as the internet. On the other hand, a private cloud is a proprietary network that supplies services to a specific set of users. A hybrid cloud combines private and public cloud services.

Cloud system 102 may offer, provide or deploy various types of cloud services for a user or customer. These could include Infrastructure as a Service (IaaS), Platform as a Service (PaaS), Software as a Service (SaaS), and so forth. Cloud system 102 may include various types of service elements (or computing resources). These computing resources may be hardware resources, software resources, or any combinations thereof. For example, hardware resources may include computer systems, computer servers, workstations, or any other computer devices. And, software resources may include operating system software (machine executable instructions), firmware, and/or application software. Computing resources may also include virtual machines, virtual servers, storage resources, load balancers, firewalls, etc. In an implementation, some or all of the computing resources provided by cloud system 102 may be utilized by a user (customer) of cloud system 102.

Referring to FIG. 1, cloud system 102 may include a cloud service template 106. A cloud service template is akin to a building blue print designed by an architect before the start of a construction activity. Like a construction blue print, a cloud service template aims to define various computing resources that are required for implementing a cloud service. These computing resources (also termed as service elements) may include, by way of non-limiting examples, server, network, physical memory, storage, applications, etc. In an implementation, a service template designer module may be used to create a cloud service template 106. A cloud architect (or service designer) of a cloud service provider may use a service template designer module to define various building blocks (computing resources) required for implementing a service in a cloud. These computing resources are used to create a cloud service template 106 for use by a subscriber, an administrator, an operator, etc. To provide an example, for a compute infrastructure service, various computing resources required to deploy the service such as number of CPU cores, amount of memory, size of boot disk, etc. are defined in the form of a service template offering. Once a cloud service template is created, it can be used to deploy the corresponding service. A cloud service template 106 can also be reused or modified in future.

A cloud service template 106, thus, defines various resources, such as server, network, memory, and storage, that may be required to provide a cloud service A cloud service template 106 may also include a provision to install applications as desired by a subscriber of the cloud service. Although FIG. 1 shows one cloud service template 106, other examples may include more than one cloud service template.

In an example, cloud system 102 may include a cloud platform. A cloud platform may be used by a user or customer to request a new cloud service and manage an existing cloud service. Users may also use the cloud platform to view status of a pending cloud service request, pending approvals, and approved service subscriptions. Users may also use the cloud platform to request modifications in a cloud service subscription, cancel a cloud service subscription, and perform other actions related to their cloud services. In other words, cloud platform may be used to design, publish, and manage a cloud service.

Figure 2:
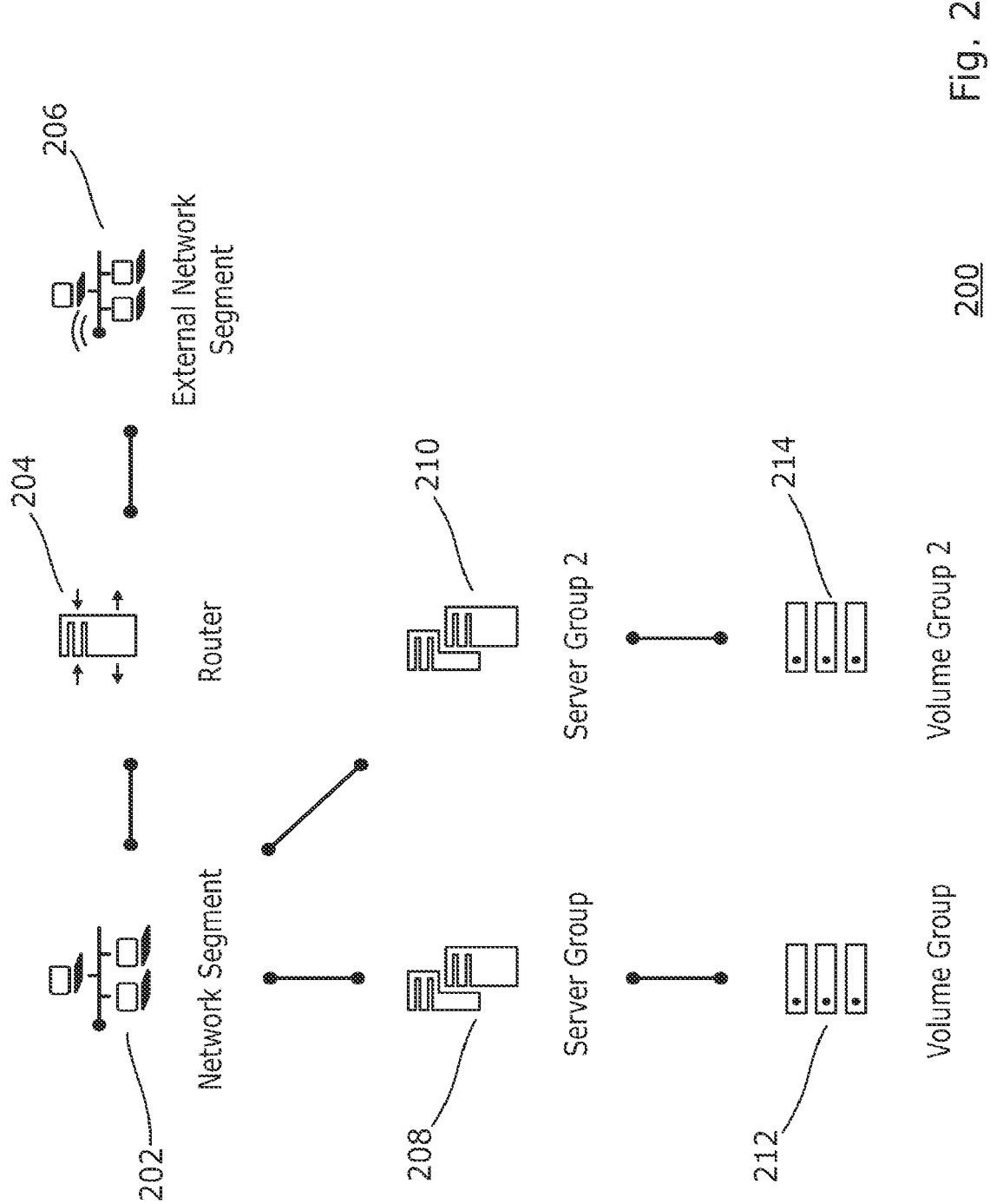
FIG. 2 is a diagram of an example cloud service template.

FIG. 2 illustrates a diagram of an example cloud service template 200. Cloud service template 200 illustrates various cloud service components that may be required to provide a cloud service through cloud system 102. In the present example, such components include a network segment 202, a router 204, an external network segment 206, a server group 208, a server group 2 (210), a volume group 212, and a volume group 2 (214)) and their relationships.

Computing system 104 may represent any type of computing device capable of reading machine-executable instructions. Examples of computing system 104 may include, without limitation, a server, a desktop computer, a notebook computer, a tablet computer, a thin client, a mobile device, a personal digital assistant (PDA), a phablet, and the like. In the example of FIG. 1, computing system 104 may include a Key Service Indicators (KSI) module 108, a link module 110, and an identification module 112. These modules are described later in this document.

Figure 3:
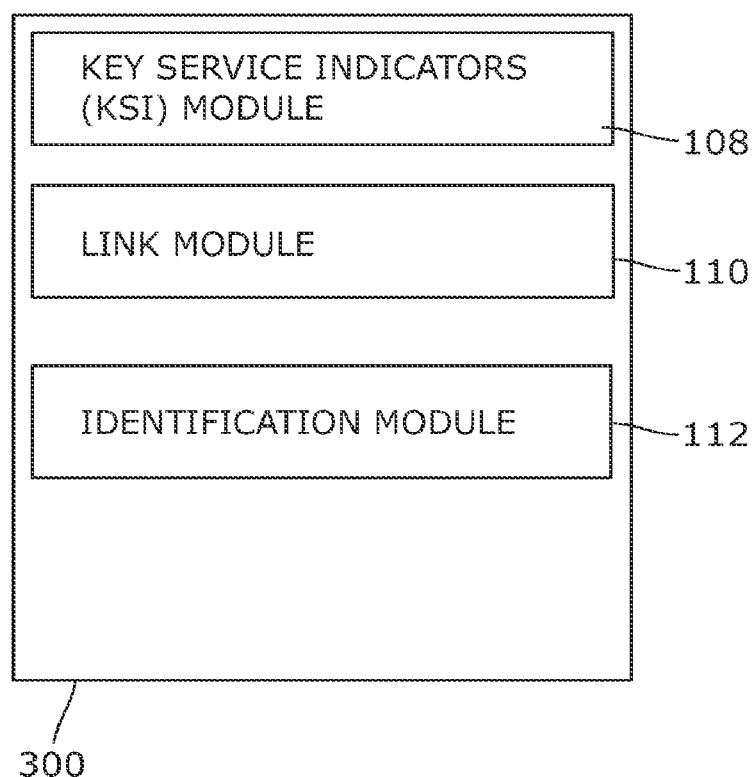
FIG. 3 is a block diagram of an example computer system for providing a customized cloud service.

FIG. 3 illustrates a system 30 for customizing a cloud service, according to an example. In an example, system 300 may be similar to computing system 104 described above. Accordingly, components of system 300 that are similarly named and illustrated in system 104 may be considered similar. In the example of FIG. 3, system 300 may include a Key Service Indicators (KSI) module 108, a link module 110, and an identification module 112. In an example, the aforesaid components of system 300 may be implemented as machine-readable instructions stored on a machine-readable storage medium. The machine-readable storage medium storing such instructions may be integrated with the system 300, or it may be an external medium that may be accessible to the system 300.

The term "module" may refer to a software component (machine executable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computing device.

Key Service Indictors (KSI) module 108 may include machine-readable instructions to receive Key Service Indictors (KSI) for a cloud service or workload. As used herein, Key Service Indicators (KSI) may be defined as those factors that may help an organization define and measure progress toward pre-defined goals from a cloud service. KSI may be quantifiable parameters that may reflect an organization's expectations from a cloud service. Some non-limiting examples of KSI may include performance, security, latency, availability, scalability, relevance, and cost. KSI may differ depending on the enterprise. They may also vary depending on the cloud service KSI may be assigned measurable (for example, 5, 10.8, etc.) or non-measurable values (for example, reliable, very reliable, highly reliable, etc.).

In an example, Key Service Indictors (KSI) module 108 may receive Key Service Indictors (KSI) from a user or customer of a cloud service. In another instance, Key Service Indictors (KSI) may be provided by a cloud service provider or an intermediary (for example, a cloud broker) between a cloud service provider and a customer. Key Service Indictors (KSI) module may also receive individual values for the Key Service Indictors (KSI) defined for a cloud service. Computer system 300 may include a user interface component (for example, a Graphical User Interface) for receiving Key Service Indictors (KSI) for a cloud service. In an example, such user interface component may be provided by the Key Service Indictors (KSI) module.

In an example, different KSI may be defined for different time periods (for example, daily, weekly, monthly, weekdays-weekends, regular season-festival season, holidays, etc.). Further, KSI may be specified for a specific time range or duration (for example, 9 AM to 9 PM).

Figure 4:
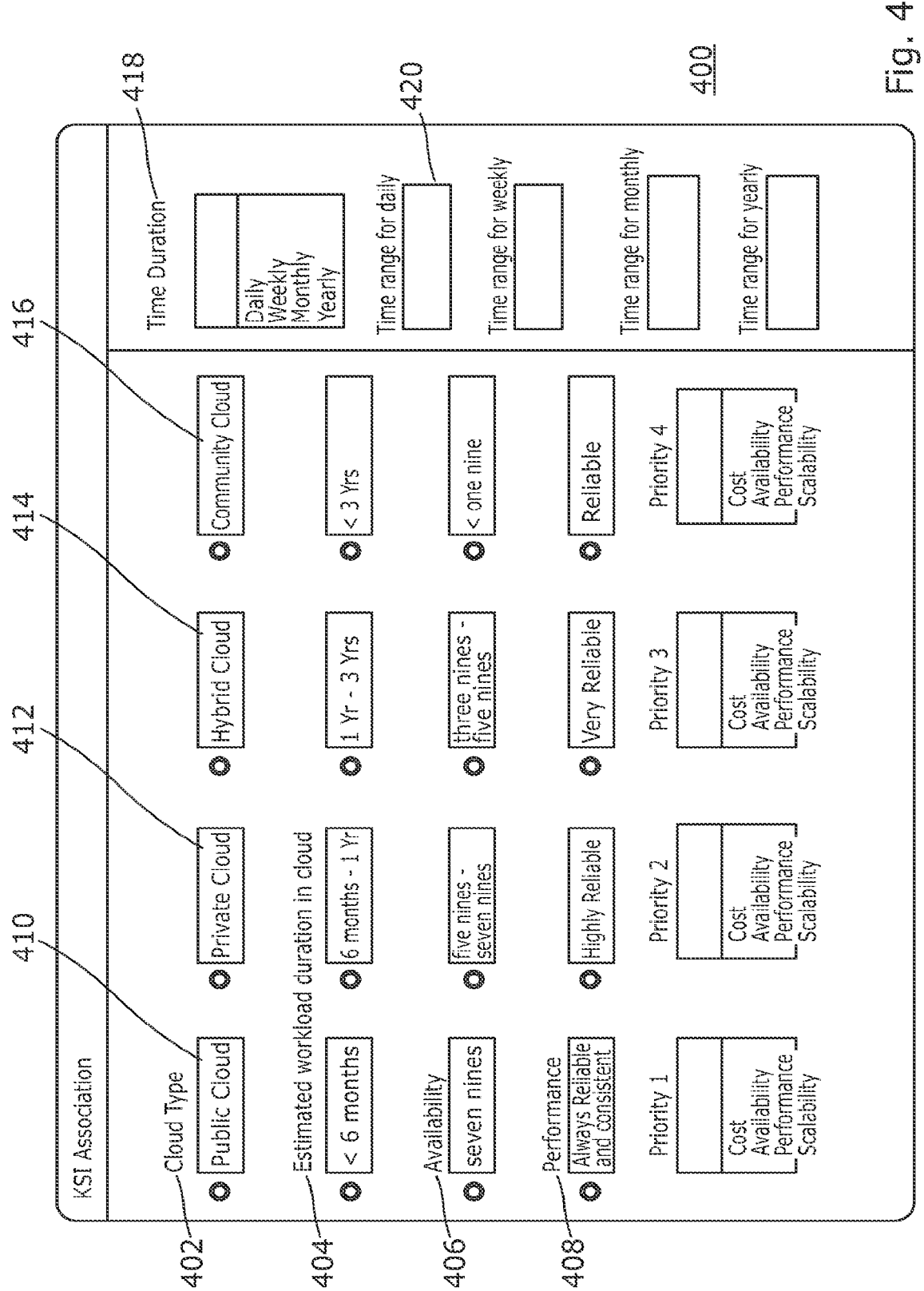
FIG. 4 illustrates an example user interface for associating Key Service Indictors (KSI) with a cloud service template.

Link module 110 may include machine-readable instructions to associate Key Service Indictors (KSI), received by Key Service Indictors (KSI) module, with a cloud service template that may provide the cloud service. The cloud service template may be present in a cloud system. In an example, link module may associate the Key Service Indictors (KSI) with a cloud service template for a specific time period. In such case, the associated Key Service Indictors (KSI) would apply to the cloud service template only for the specified period. In an example, different KSI may be associated with a cloud service template for different time periods (for example, daily, weekly, monthly, weekdays-weekends, regular season-festival season, holidays, etc.). Further, KSI may be associated with a cloud service template for a specific time range or duration (for example, 9 AM to 9 PM). FIG. 4 illustrates an example user interface 400 for associating Key Service Indictors (KSI) with a cloud service template. The user interface identifies different Key Service Indictors (KSI), for example, cloud type 402, estimated workload duration in cloud 404, availability 406, and performance 408, which may be associated with a cloud service template. The user interface also defines various values for each of the Key Service Indictors (KSI). For example, Key Service Indictor "Cloud Type" may include the following values: public cloud 410, private cloud 412, hybrid cloud 414, and community cloud 416. Likewise, Key Service Indictor "Availability" may include the following values: seven nines, five nines-seven nines, three nines-five nines, and <one nine. The user interface 400 also includes an option to specify a time period 418 during which selected Key Service Indictors (KSI) may apply to the cloud service template, and to the cloud service based thereon. A user (for example, a customer, a cloud service provider, a cloud broker etc.) may use the user interface to select the Key Service Indictors (KSI), define values for the selected Key Service Indictors (KSI), and specify time period (for example, specific time range) 420 for the application of selected Key Service Indictors (KSI). Upon receipt, link module may associate such information with the cloud service template.

Computer system 300 may include a user interface component (for example, a Graphical User Interface) for associating the Key Service Indicators with the cloud service template in the cloud system. In an example, such user interface component may be provided by the Link module.

In an example, link module 110 may be coupled with a cloud service template designer module (not shown). Cloud service template designed module may be used by a user to design a cloud service template. As mentioned earlier, a cloud service template may specify cloud service components and their relationships to define a cloud service lifecycle. In said example, Key Service Indictors (KSI) may be associated with a cloud service template when it is created.

Identification module 112 may include machine-readable instructions to identify, based on the received Key Service Indictors (KSI), resources required for providing the cloud service. Such "resources" may include computing resources, as described earlier. For instance, these resources may be hardware resources, software resources, or any combinations thereof. For example, hardware resources may include computer systems, computer servers, workstations, or any other computer devices. And, software resources may include operating system software (machine executable instructions), firmware, and/or application software. Computing resources may also include virtual machines, virtual servers, storage resources, load balancers, firewalls, etc. In an example, the aforementioned resources may be present in cloud system. Upon identification, identification module may provision such resources for providing the cloud service.

As mentioned earlier, different KSI may be defined for different time periods (or for a specific duration). In such case, identification module 112 may identify a different set of computing resources for each time period. To provide an example, let's consider a scenario wherein a set of Key Service Indictors (KSI) i.e. "Cloud type" and "Availability" may be associated with a cloud service template. In an instance, these KSI may be assigned different values for different time periods. For instance, during regular days in the month of December, "Cloud type" and "Availability" may include values "public cloud" and "seven nines", respectively. However, during holidays between Christmas and a New Year, these KSI may include values "public cloud" and "three nines-five nines", respectively. In such case, identification module may identify different computing resources for each time period. For instance, for the holiday period, identification module may identify a server(s) with less number of CPU cores, since the KSI value for "Availability" i.e. "three nines-five nines" is less as compared to the requirement during the regular days. Thus, identification module 112 may identify different computing resources for different time periods based on the Key Service Indictors (KSI) associated with a cloud service template for a particular time period.

In an example, computer system may include a monitoring module (not shown) for monitoring Key Service Indictors (KSI) associated with a cloud service template for various time periods. Monitoring module may be coupled to the identification module 112. Once the monitoring module determines the Key Service Indictors (KSI) associated with the cloud service template for a particular time period, it may passes on the information to the identification module 112. The identification module, in turn, may use such information to identify and provision resources for providing a cloud service for such time period only. Identification module 112 may also use such information to modify previously provisioned resources, reclaim resources, turn on or turn off features or functionalities of existing tools, modify, migrate, or redeploy a cloud service with a changed configuration, if required.

Once the resources required for providing a cloud service, based on KSI associated with a cloud template used for deploying the cloud service, are identified by identification module 112, cloud system 102 may provision such resources and provide the cloud service to a user. In an example, further to such deployment, monitoring module may continue to monitor selection of Key Service Indictors (KSI), by a user, for association with a cloud service template(s) in a cloud system 120, over a period. Such kind of feedback information may be used by the identification module 102 of the computer system 104 to identify, for instance, an appropriate set of resources, tools and configurations for the deployment of a cloud service for a particular user. Such information may also be used by the cloud system 102 to offer a new or refined cloud service template.

Figure 5:
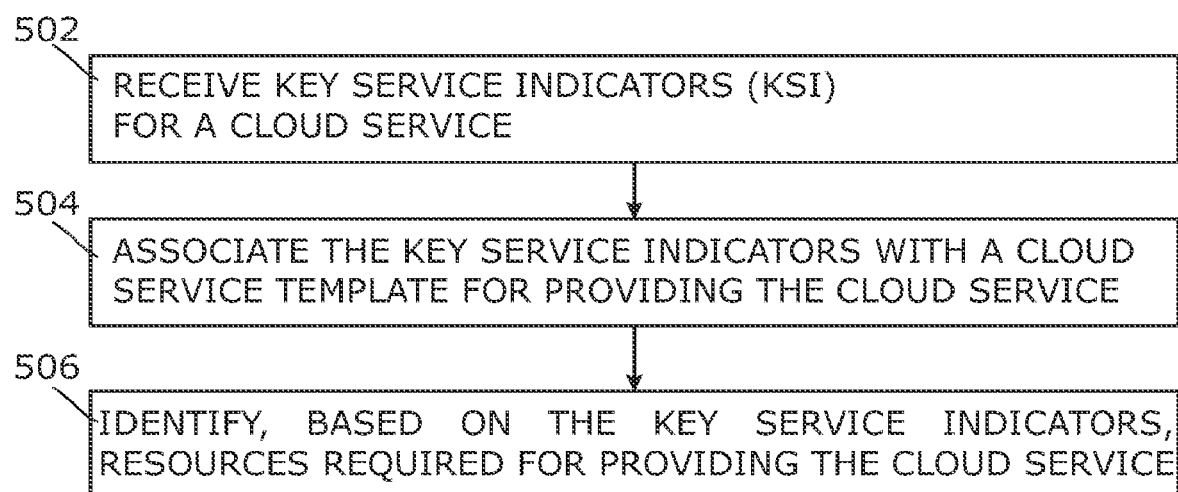
FIG. 5 is a flow chart of an example method for providing a customized cloud service.

FIG. 5 is a flow chart of an example method 500 for providing a customized cloud service. The method 500, which is described below, may be executed on a computer system such as computer system 104 of FIG. 1 and computer system 300 of FIG. 3. However, other computing systems may be used as well. At block 502, Key Service Indicators (KSI) may be received for a cloud service or workload. At block 504, the Key Service Indicators may be associated with a cloud service template for providing a cloud service. At block 504, resources required for providing the cloud service may be identified based on the Key Service Indicators.

Figure 6:
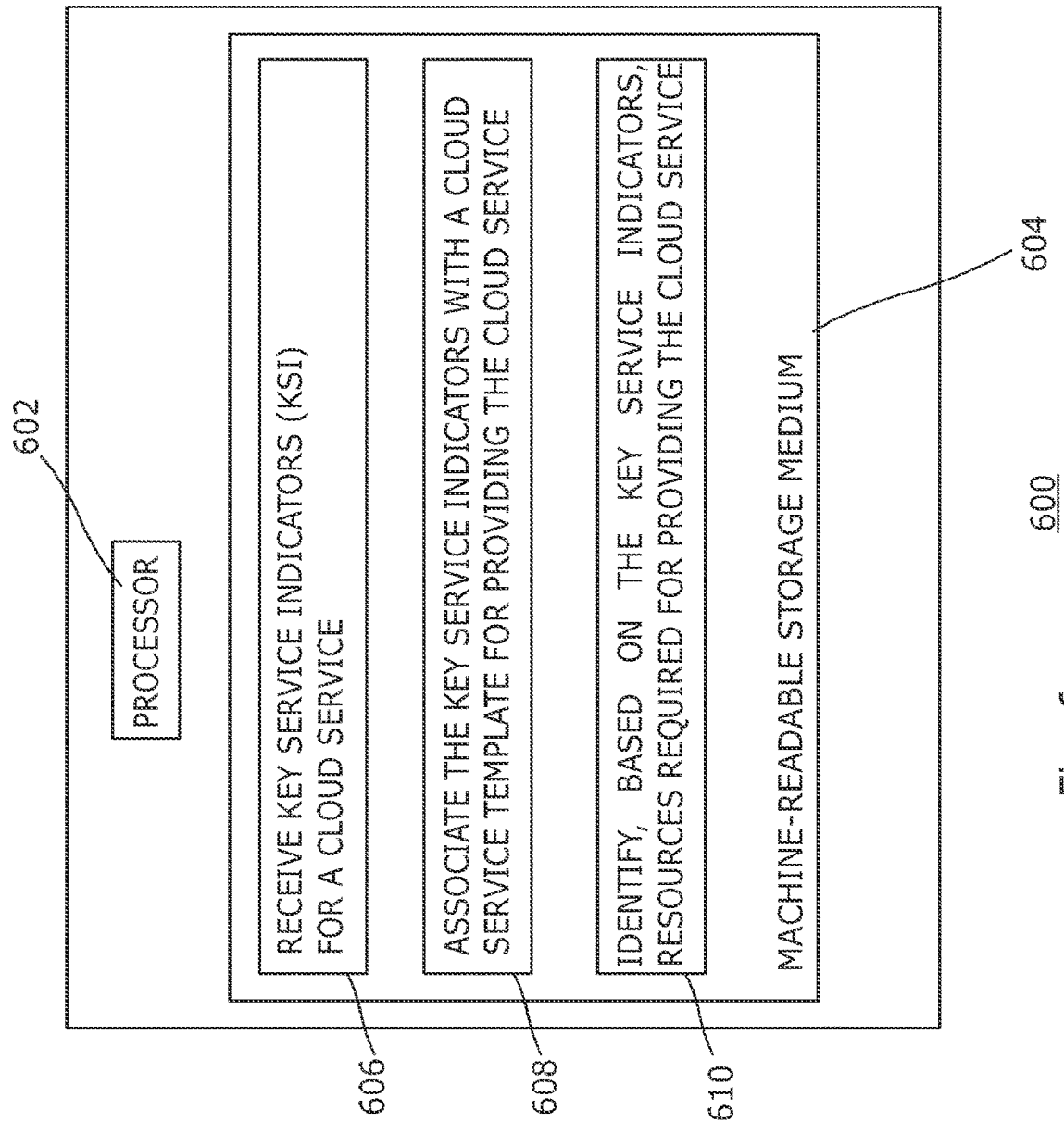
FIG. 6 is a block diagram of an example system for providing a customized cloud service.

FIG. 6 is a block diagram of an example system 600 for providing a customized cloud service. System 600 includes a processor 602 and a machine-readable storage medium 604 communicatively coupled through a system bus. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to system 600.

Machine-readable storage medium 604 may store instructions 606, 608, and 610. In an example, instructions 606 may be executed by processor 602 to receive Key Service Indicators (KSI) for a cloud service. Instructions 604 may be executed by processor 602 to associate the Key Service Indicators with a cloud service template for providing the cloud service. The instructions to associate may further include instructions to associate distinct Key Service Indicators (KSI) with the cloud service template, for different time periods; monitor the distinct Key Service Indicators (KSI) associated with the cloud service template, for different time periods; and identify, based on the distinct Key Service Indicators, resources required for providing the cloud service during different time periods. Instructions 604 may be executed by processor 602 to identify, based on the Key Service Indicators, resources required for providing the cloud service.

Machine-readable storage medium 604 may further store instructions executable by processor 602 to modify an existing cloud service template or generate a new cloud service template based on the identified Key Service Indicators. Machine-readable storage medium 604 may further store instructions executable by processor 602 to identify computing resources for providing the cloud service.

For the purpose of simplicity of explanation, the example method of FIG. 5 is shown as executing serially, however it is to be understood and appreciated that the present and other examples are not limited by the illustrated order. The example systems of FIGS. 1, 3 and 6, and method of FIG. 5 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method, comprising:
associating Key Service Indicators (KSIs) with a cloud service template for providing a cloud service, the cloud service template comprising a total number of Central Processing Unit cores, a total amount of memory, and a size of a boot disk required for the cloud service;
wherein the associating further includes:
associating distinct KSIs with the cloud service template;
monitoring the distinct KSIs associated with the cloud service template; and
identifying, based on the distinct KSIs, resources required for providing the cloud service;
wherein the cloud service is monitored and feedback is obtained from a user of the cloud service and based on the feedback a set of the resources and a configuration of the cloud service template are identified.

2. The method of claim 1, further comprising providing the cloud service to the user.

3. The method of claim 1, wherein the KSIs at least comprise a quantifiable security parameter associated with the cloud service.

4. The method of claim 1, further comprising identifying, based on the KSIs, the resources required for providing the cloud service wherein the resources comprise hardware resources and software resources, at least one resource comprising a bad balancer.

5. The method of claim 1, further comprising providing a cloud platform that provides a status for the cloud service, a pending approval for the cloud service, and approved cloud service subscriptions.

6. The method of claim 1, further comprising obtaining a refined cloud service template and suggesting changes to the cloud service template to achieve the refined cloud service template based on the feedback.

7. A system for providing a customized cloud service, comprising:
a processor; and
a non-transitory computer readable storage medium comprising executable instructions representing Key Service Indicator (KSI) instructions, link instructions, identification instructions, and cloud platform instructions;

the executable instructions when executed by the processor cause the processor to use the KSI instructions to receive KS's for a cloud service;

the link instructions to associate the KSIs with a cloud service template for providing a cloud service, the cloud service template comprising a total number of Central Processing Unit cores, a total amount of memory, and a size of a boot disk required for the cloud service;

wherein the associated KSIs further include:

an association of distinct KSIs with the cloud service template;

a monitor of the distinct KSIs associated with the cloud service template; and an identification, based on the distinct KSIs, of resources required for providing the cloud service;

wherein the cloud service is monitored and feedback is obtained from a user of the cloud service and based on the feedback a set of the resources and a configuration of the cloud service template are identified.

8. The system of claim 7, wherein the KSI instructions include a user interface to receive the KSIs for the cloud service.

9. The system of claim 7, wherein the link instructions include a user interface to associate the KSIs with the cloud service template in the cloud system.

10. The system of claim 7, wherein the cloud system is one of a public cloud, a private cloud, and a hybrid cloud.

11. The system of claim 7, wherein the KSIs are provided by one of the user of the cloud service, a cloud service provider providing the cloud service, and an agent between the cloud service provider and the user of the cloud service.

12. A non-transitory machine-readable storage medium comprising instructions, when executed by a processor, cause the processor to perform:

associating Key Service Indicators (KSIs) with a cloud service template for providing a cloud service, the cloud service template comprising a total number of Central Processing Unit cores, a total amount of memory, and a size of a boot disk required for the cloud service;

wherein the associating further includes:

associating distinct KSIs with the cloud service template;

monitoring the distinct KSIs associated with the cloud service template; and identifying, based on the distinct KSIs, resources required for providing the cloud service;

wherein the cloud service is monitored and feedback is obtained from a user of the cloud service and based on the feedback a set of the resources and a configuration of the cloud service template are identified.

13. The storage medium of claim 12, wherein the processor performs modifying an existing cloud service template or generates a new cloud service template based on identified KSIs.

14. The storage medium of claim 12, wherein the processor performs providing the cloud service to the user.

15. The storage medium of claim 12, wherein the KSIs at least comprise a quantifiable security parameter associated with the cloud service.

16. The storage medium of claim 12, wherein the processor performs identifying, based on the KSIs, the resources required for providing the cloud service wherein the resources comprise hardware resources and software resources, at least one resource comprising a load balancer.

17. The storage medium of claim 12, wherein the processor performs providing a cloud platform that provides a status for the cloud service, a pending approval for the cloud service, and approved cloud service subscriptions.

18. The storage medium of claim 12, wherein the processor performs obtain ng a refined cloud service template and suggesting changes to the cloud service template to achieve the refined cloud service template based on the feedback.

* * * * *